United States Patent [19]

Watler

[11] Patent Number: 4,857,078
[45] Date of Patent: Aug. 15, 1989

[54] PROCESS FOR SEPARATING HIGHER HYDROCARBONS FROM NATURAL OR PRODUCED GAS STREAMS

[75] Inventor: Kenneth G. Watler, Houston, Tex.

[73] Assignees: Membrane Technology & Research, Inc., Menlo Park, Calif.; K. Watler, Houston, Tex.

[21] Appl. No.: 139,914

[22] Filed: Dec. 31, 1987

[51] Int. Cl.$^4$ .............................................. B01D 53/22
[52] U.S. Cl. ........................................ 55/16; 55/158; 585/818
[58] Field of Search ............................ 55/16, 68, 158; 585/818, 819

[56] References Cited

U.S. PATENT DOCUMENTS

| | | | |
|---|---|---|---|
| 3,534,528 | 10/1970 | Porter | 55/16 |
| 3,903,694 | 9/1975 | Aine | 55/16 X |
| 4,130,403 | 12/1978 | Cooley et al. | 55/16 |
| 4,171,017 | 10/1979 | Klass | 55/16 X |
| 4,230,463 | 10/1980 | Henis et al. | 55/16 |
| 4,238,204 | 12/1980 | Perry | 55/16 |
| 4,243,701 | 1/1981 | Riley et al. | 55/158 X |
| 4,370,150 | 1/1983 | Fenstermaker | 55/16 |
| 4,386,944 | 6/1983 | Kimura | 55/16 |
| 4,428,776 | 1/1984 | Li | 210/500.2 X |
| 4,553,983 | 11/1985 | Baker | 55/16 |
| 4,575,385 | 3/1986 | Brooks et al. | 55/158 |
| 4,589,896 | 5/1986 | Chen et al. | 55/68 X |
| 4,597,777 | 7/1986 | Graham | 55/16 |
| 4,666,469 | 5/1987 | Krueger et al. | 55/16 |

FOREIGN PATENT DOCUMENTS

| | | | |
|---|---|---|---|
| 181850 | 5/1986 | European Pat. Off. | 55/158 |
| 432 | 1/1986 | Japan | 55/158 |

OTHER PUBLICATIONS

G. E. Spangler, "Analysis of two membrane inlet systems on two potential trace vapor detectors", Amer. Lab., 1 (1975), 36–45.

C. E. Rogers et al., "Separation by permeation through polymeric membranes", Recent Developments in Separation Science, vol. II, CRC, Cleveland, OHio, 1972, 107–155.

H. Strathmann et al., "The Formation Mechanism of Asymmetric Membranes", Desalination, vol. 16, pp. 179–203 (1975).

W. J. Ward, III et al., "Ultrathin Silicone Polycarbonate Membranes for Gas Separation Processes", J. Memb. Sci., 1, pp. 99–108 (1976).

S. S. Kreman, "Technology and Engineering of ROGA Spiral-Wand Reverse Osmosis Membrane Modules", Reverse Osmosis and Synthetic Membranes, 1977, Chapter 17, pp. 371–385.

K. V. Peinemann et al., "The Separation of Organic Vapors from Air", AICHE Symposium Series No. 250, vol. 82 (1986), pp. 19–26.

S. Weller et al., "Fractionation Permeation through Membranes", Chem. Eng. Prog., vol. 46, 585–591 (1950).

C. V. Pan et al., "An Analysis of the Single Stage Gaseous Permeation Process", Ind. Eng. Chem. Fundam., vol. 13, No. 4, 1974, pp. 323–331.

"The Use of Swollen Silicone Rubber Membranes for Natural Gas Separations", M. S. Brennan et al., presented at ICOM '87, Tokyo, Japan, Jun. 1987.

*Primary Examiner*—Robert Spitzer
*Attorney, Agent, or Firm*—J. Farrant

[57] ABSTRACT

A process for separating ethane and other higher hydrocarbons from a natural or produced gas stream, having methane as its major constituent. A rubbery permselective membrane, having a propane/methane selectivity of 8 or above, is contacted on its feed side with a gas mixture typically containing methane, ethane, propane, butane, and small amounts of other hydrocarbons, water vapor, hydrogen sulfide and carbon dioxide. Carbon dioxide, water vapor, ethane and the other higher hydrocarbons permeate preferentially through the membrane, and the retentate stream is correspondingly enriched in methane.

8 Claims, 1 Drawing Sheet

PROCESS FOR SEPARATING HIGHER HYDROCARBONS FROM NATURAL OR PRODUCED GAS STREAMS

BACKGROUND OF THE INVENTION

Natural gas is the most important fuel gas in the United States, and is also used extensively as a basic raw material in the petrochemical and other chemical process industries. The composition of natural gas varies widely from field to field. For example, a raw gas stream may contain as much as 95% methane, with small amounts of other hydrocarbons, nitrogen, carbon dioxide, hydrogen sulfide or water vapor. On the other hand, streams that contain relatively large proportions, up to say 10%, of propane, butane, or ethane, or combinations of these, are also commonly encountered, as are mixtures with a high carbon dioxide content. The heats of combustion of the principal hydrocarbon constituents are listed in the table below.

| Component | Btu value/cubic foot |
|---|---|
| Methane | 1010 |
| Ethane | 1769 |
| Propane | 2517 |
| Butane | 3262 |
| Pentane | 4000 |

For safety reasons, the Btu rating of natural gas that is to be carried through a pipeline is usually controlled within a fairly narrow range, typically 950–1050 Btu/cubic foot. Because of the higher Btu values of ethane, butane annd pentane, natural gases that contain significant proportions of these are too high in Btu value to be fed directly to a pipeline, or for direct use as commercial or domestic fuels. Equally importantly, ethane, propane and butane are of too much industrial value in their own right to be essentially wasted as secondary components in the gas mixture. Thus it can be seen that it is almost always necessary to subject raw natural gas to a treatment process of some kind, both to remove undesirable components such as sour gas, carbon dioxide or water vapor; to recover the valuable hydrocarbons, and to bring the Btu value to an industry standard level.

The conventional way to separate the hydrocarbon components is a refrigerated condensation process operating down to about −40° C. More modern plants use a cryogenic isentropic expansion method, and operate down to −100° C. The condensed liquids are separated from the gas stream, then subjected to fractional distillation under pressure to recover individual components. The gas residue frequently requires recompression before pipelining. These processes consume relatively large quantities of energy, which is reflected in the price of the finished gas.

It is also important to remove water vapor, which could otherwise condense in the pipeline with resulting corrosion. Dehydration is typically achieved by compression of the gas, followed by adsorption of the water vapor into water-drying agents such as glycol, activated alumina or bauxite, silica gel, and so on. Hydrogen sulfide and any other sulfur compounds present must also be reduced, not only because of toxicity, but also because they can cause corrosion in the pipeline, have an unpleasant odor, and give rise to air pollution when burnt. There are many commercial reagents that can be used for hydrogen sulfide removal; they involve the use of either a physical solvent or a chemical reagent in aqueous solution. Carbon dioxide, which can lower the heating value of the gas, is also removed this way. The most widely used solvent is monoethanolamine. Sometimes this is combined with diethylene glycol, so that the dehydration and desulfurization steps are carried out simultaneously. There is a disadvantage to these methods, in that some solvents used have a high affinity for the higher hydrocarbons, which may then be lost with the sour gas segment. The sulfur compounds removed from the gas are generally used to recover elemental sulfur by the Claus process.

From the above discussion, it is apparent that natural gas treatment involves a range of treatment steps that may be complex, costly, and may generate products that require further treatment. A simple, energy efficient process that can generate pipeline-quality methane in a single pass, and/or recover propane, butane and other useful hydrocarbons, would thus be of considerable benefit to the industry.

The use of membrane-based systems as an alternative to conventional technology to separate gases is known for some applications. For example, commercial systems for oxygen/nitrogen separation are now available under the name Generon ® from Dow Chemical, Midland, Mich. Membrane systems that can recover hydrogen are offered by Permea, Inc., a subsidiary of Monsanto; and by DuPont under the name Permasep ®. Grace Membrane Systems, a subsidiary of W. R. Grace, sells systems that can separate carbon dioxide from methane, or hydrogen from a variety of gas mixtures. Membranes have found some applications in the oil and gas industry, in hydrogen sulfide reduction, or in treating gas streams containing large volumes of carbon dioxide, typically arising from EOR (enhanced oil recovery). References that describe this type of application are for example U.S. Pat. Nos. 4,597,777; 4,589,896; 4,130,403; and 4,428,776. These references employ synthetic membranes made from glassy polymers, which have good selectivity for polar gases over the hydrocarbon components of the mixture. A typical membrane that has been used commercially, for example, is a cellulose triacetate hollow fiber, available from Dow/Cynara, or polysulfone, available from Monsanto. Glassy polymers, such as cellulose diacetate, cellulose triacetate or polysulfone, are, however, relatively unselective for one hydrocarbon over another, and are unsuitable for separating methane or ethane from $C_3$ or $C_3+$ hydrocarbons. In fact, these types of membrane often are more permeable to methane than to the $C_2+$ hydrocarbons.

That rubbery membrane materials may be useful for performing some gas or vapor separations is known in the art, and is reflected in the patent literature. For example, U.S. Pat. No. 4,553,983 to Baker teaches a process for recovering organic vapors from air using rubbery membranes. Other references that mention the use of silicone rubber or other rubbery materials are for instance U.S. Pat. Nos. 4,230,463; 3,369,343; and 3,903,694.

The relatively high permeability of some rubbery polymers to hydrocarbon vapors has been reported in the literature. For example, a paper by G. E. Spangler, "Analysis of two membrane inlet systems on two potential trace vapor detectors", Amer. Lab., 7, (1975), 36, includes a graph of the permeability of silicone rubber to a large number of organic vapors. Similar data is available in an applications brochure for silicone rubber published by General Electric Company, and in a chapter by C. E. Rogers et al., "Separation by permeation through polymeric membranes", in *Recent Developments in Separation Science*, Vol. II, Chemical Rubber Co., Cleveland, OH, 1972. Silicone rubber membranes, however, although more permeable to ethane and the heavier hydrocarbons than to methane, are still relatively unselective. For example propane is only four times more permeable than methane. In general, this degree of selectivity is inadequate to treat natural gas, or similar, streams. It should be noted, also, that in all these references the permeability figures quoted are obtained from separate measurements on pure gas or vapor streams. As is known in the art, the ideal selectivity, expressed as a ratio of these permeabilities, is frequently not achieved with actual gas mixtures. This is because one or more constituents in the gas mixture may alter the membrane, for example by swelling, to such a degree that its properties are radically changed. Hence the behaviour of a membrane with samples of pure gases or vapors is not necessarily a reliable indicator of its behaviour in an actual separation system.

Thus, despite the theoretical knowledge described above, and the diverse teachings of the prior art as regards the use of membranes for gas separation, applicant believes there has not previously been a membrane-based process useful in separating methane from ethane and heavier hydrocarbon gases, and in recovery of propane and/or natural gas liquids (NGL) from natural or produced gas streams.

SUMMARY OF THE INVENTION

It is an object of the present invention then to make available a membrane-based process for separation of propane and higher hydrocarbons from a gas mixture typically comprising methane, ethane, higher hydrocarbons, carbon dioxide, nitrogen, hydrogen sulfide and water vapor.

It is a further object of the invention to provide a membrane-based process for BTU control of fuel gases.

It is another object of the invention to provide a membrane-based process for NGL (natural gas liquid) recovery from associated gases.

It is another object of the invention to provide a membrane-based process for NGL recovery from EOR (enhanced oil recovery) produced streams.

It is another object of the invention to provide a membrane-based process for NGL recovery from refinery or petrochemical processing gases.

It is yet another object of the invention to provide a membrane-based process for natural gas dew point control.

It is yet another object of the present invention to provide a membrane-based system that can be used for pretreatment of hydrocarbon-containing gas streams.

Additional objects and advantages of the present invention will be apparent from the description below to those of ordinary skill in the art.

To achieve the foregoing objects, the invention provides a process for treatment of natural or produced gas streams. These streams typically have methane as their major component, and may also contain significant quantities of ethane, propane, butane and other higher hydrocarbons, nitrogen, carbon dioxide, water vapor, and hydrogen sulfide. The process involves contacting the untreated gas stream with a thin permselective membrane. The membrane is a rubbery material under the operating conditions of the system, that is, it has a glass transition temperature at least 20° C. below the temperature of the feed gas.

All the constituents of the feed stream, except nitrogen, have a higher permeability through rubbery materials than does methane. Thus these gases and vapors permeate preferentially through the membrane, and are withdrawn from the permeate side. Depending on the composition of the raw gas, the performance characteristics of the membrane, membrane area, and the system operating parameters, the system may be tailored to a variety of gas processing problems encountered in the natural gas and oil industries.

To achieve a high flux of the permeating components, the permselective membrane should be made as thin as possible. A preferred embodiment of the invention then involves the use of a composite membrane comprising a microporous support, onto which the rubbery permselective layer is deposited as an ultrathin coating. The preparation of such membranes is known in the art, and is discussed in detail below.

The membrane configuration is not critical to the invention. In a preferred embodiment, the membranes are cast and coated as flat sheets, and then rolled into spiral-wound modules. However, other types of configuration, such as hollow fibers, plate-and-frame, or flat sheet membranes are also possible and are intended to be within the scope of the invention.

The flux of a gas or vapor through a polymer membrane is proportional to the pressure difference of that gas across the membrane. To achieve high fluxes of the permeating components, it is desirable not only to make the permselective membrane very thin, but also to operate the system with a high pressure drop across the membrane. Composite polymer membranes are mechanically quite strong, and can typically operate up to pressure differences of 1500 or 2000 psi. As with the composition, the pressure at which raw natural gas emerges also varies considerably from field to field, although pressures up to 5000 psi are not uncommon. Thus it may sometimes be necessary to lower the gas pressure before it can be fed to the membrane system. In some instances, such as when the gas stream to be treated is not raw gas from a well, but a produced gas from some other process, the gas pressure may be too low for the membrane system to operate efficiently, and it may be necessary to incorporate a compressor into the treatment system prior to feeding the gas stream to the membrane.

Depending on the origin and composition of the gas, it may be necessary to incorporate a phase separator, or a heater, or both, into the system ahead of the membrane unit. These will remove liquid water, if necessary, and condensed or liquid hydrocarbons that might damage the membranes.

It is to be understood that the foregoing general description and the following detailed description are intended to explain and illustrate the invention, without restricting its scope.

DETAILED DESCRIPTION OF THE INVENTION

Figure 1:
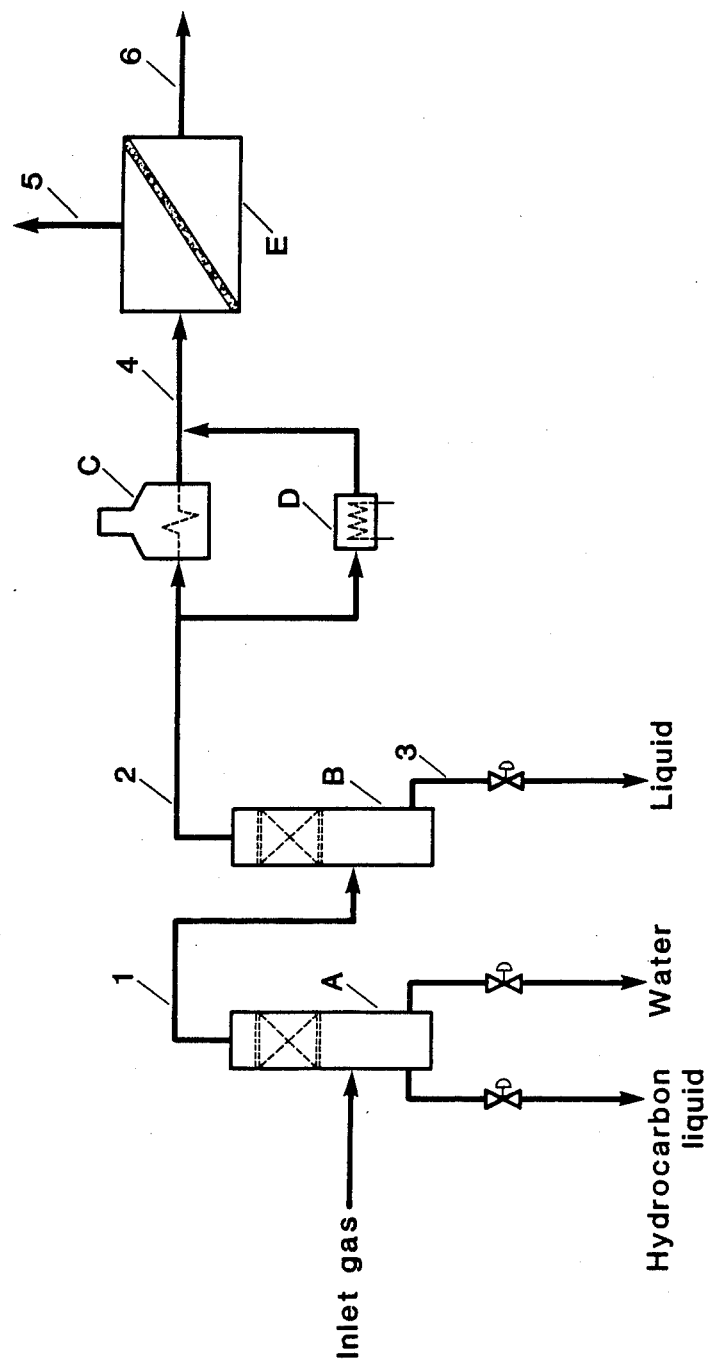
FIG. 1 is a schematic representation of an apparatus which can be used to carry out the invention.

The term gas as used herein refers to gases or vapors.

The term permselective as used herein refers to polymers, or membranes made from those polymers, that exhibit selective permeation for at least one gas or vapor in a mixture over the other components of the mixture, enabling a measure f separation between the components to be achieved.

The term multilayer as used herein means comprising a support membrane and one or more coating layers.

The term ideal separation factor as used herein means the separation factor of a membrane or membrane element for one gas or vapor over another determined by means of tests using pure gas samples rather than gas mixtures.

The feed streams which can be treated by the process of the present invention may arise from a variety of sources, including natural gas fields, associated gases from oil fields, and produced gas streams from oil refineries or petrochemical processing plants. The scope of the invention is not intended to be limited to any particular gas streams, but to encompass any situation where a gas stream containing primarily methane and at least one other hydrocarbon gas is to be separated. The composition of the gas may vary widely, from a mixture that contains 95%+ pure methane, with small amounts of ethane, other hydrocarbons, water vapor, hydrogen sulfide, carbon dioxide and nitrogen, to streams that contain substantial percentages of $C_3+$ hydrocarbons or carbon dioxide.

In the process of the present invention, a feed stream containing methane and at least one of ethane, propane, butane, higher hydrocarbons, carbon dioxide, hydrogen sulfide, nitrogen and water vapor is passed across a thin, permselective membrane. The permselective membrane forms a barrier which is relatively permeable to ethane, propane, butane, and higher hydrocarbons, but relatively impermeable to methane.

Preferred embodiments of the invention employ a multilayer membrane comprising a microporous support onto which is coated an ultrathin permselective layer of a rubbery polymer. The microporous support membrane should have a flow resistance which is very small compared to the permselective layer. A preferred support membrane is an asymmetric Loeb-Sourirajan type membrane, which consists of a relatively open, porous substrate with a thin, dense, finely porous skin layer. Preferably the pores in the skin layer should be less than 1 micron in diameter, to enable it to be coated with a defect-free permselective layer. The support membrane should resist the solvents used in applying the permselective layer. Since many of the polymer materials which might be used for the permselective layer are soluble only in aggressive solvents, such as toluene, methylene chloride, or tetrahydrofuran, a solvent resistant support material, such as polyimide or polysulfone, is desirable. Asymmetric polysulfone and polyimide membranes are available commercially for ultrafiltration applications, for example as NTU ® 4220 1 (crosslinked polyimide), or NTU ® 3050 (polysulfone) from Nitto Electric Industrial Company, Osaka, Japan. Either support may be used with a silicone rubber permselective layer; for other rubbery materials polyimide supports may be better. Other suitable support membranes may be made by the process described in an article by H. Strathmann, K. Kock, P. Amar and R. W. Baker, entitled "The Formation Mechanism of Asymmetric Membranes", in Desalination, Vol. 16, p. 179 (1975). Polymers which may be used include polyvinylidene fluoride (Kynar ® 461, Pennwalt Corp., Philadelphia, Pa.), or aromatic polyamides (Nomex ® 450, DuPont, Wilmington, Del.). Simple isotropic supports, such as microporous polypropylene or polytetrafluoroethylene can also be used. The thickness of the support membrane is not critical, since its permeability is high compared to that of the permselective layer. However the thickness would normally be in the range of 100 to 300 microns, with about 150 microns being the preferred value.

Optionally, the support membrane may be reinforced by casting it on a fabric web. The multilayer membrane then comprises the web, the microporous membrane, and the ultrathin permselective membrane. The web material may be, for example, a polyester such as Hollytex, available from Eaton-Dikeman, Mt. Holly Springs, Pa. The permselective layer could not be cast directly on the fabric web, because it would penetrate the web material, rather than forming an unbroken surface coating.

To separate the $C_3$ and $C_3+$ hydrocarbons from the natural and produced gas mixtures described above requires a permselective layer with a high selectivity for the higher hydrocarbons over methane. The ideal separation factor $\alpha_{i,j}$ for one gas over another is given by $$\alpha_{i,j} = P_i/P_j$$

where $P_i$ and $P_j$ are the permeabilities of the permselective membrane material to the two gases. The permeabilities may also be expressed as the product of the diffusion coefficient D and the Henry's Law solubility coefficient S, so that the equation becomes $$\alpha_{i,j} = \frac{D_i S_i}{D_j S_j}$$

The ratio of the diffusion coefficients is a measure of the relative mobility of the gases in the polymer material, and in general reflects the size difference between the i and j molecules. The ratio of the solubility coefficients reflects the difference in condensability between the two gases.

When glassy polymers are used, the ratio of the diffusion coefficients tends to be the controlling factor in the overall selectivity. The membrane structure is rigid, so the ability of molecules to permeate is very size dependent. For rubbery polymers, the difference in size is much less critical, because the polymer chains can be flexed, and sorption effects seem to dominate. Glassy polymers, although they are useful for example in separating carbon dioxide from methane, are relatively unselective for other hydrocarbons over methane. Rubbery materials, on the other hand, benefit from the difference in the condensabilities of the various hydrocarbons, and have good ideal selectivities for propane, butane and the higher hydrocarbons over methane, as shown by the table below.

TABLE 1

| Permeability of silicone rubber to hydrocarbon gases* | |
|---|---|
| Gas | Permeability (Barrer) |
| $CH_4$ | 800 |
| $C_2H_6$ | 2,100 |
| $C_3H_8$ | 3,500 |
| $n-C_4H_{10}$ | 7,500 |

TABLE 1-continued

| Permeability of silicone rubber to hydrocarbon gases* ||
|---|---|
| Gas | Permeability (Barrer) |
| n-C$_5$H$_{12}$ | 16,700 |

*Data from G.E. Spangler, "Analysis of two membrane inlet systems on two potential trace vapor detectors", Amer. Lab. 7, (1975), 36.

The permselective membranes used in the invention then are rubbery non-crystalline polymers, that is they have a glass transition temperature at least 20° C. below the normal operating temperature of the system. Thermoplastic elastomers are also useful. These polymers combine hard and soft segments or domains in the polymer structure. Provided the soft segments are rubbery at the temperature and operating conditions of the invention, polymers of this type could make suitable membranes for use in the invention. Polymers that may be used include, but are not limited to, nitrile rubber, neoprene, polydimethylsiloxane (silicone rubber), chlorosulfonated polyethylene, polysilicone-carbonate copolymers, fluoroelastomers polyvinylchloride, polyurethane, cis-polybutadiene, cispolyisoprene, poly(butene-1), polystyrene-butadiene copolymers, styrene/-butadiene/styrene block copolymers, styrene/ethylene/butylene block copolymers, thermoplastic polyolefin elastomers, and block copolymers of polyethers and polyesters. To maximize the flux of permeating components, the permselective layer should be made as thin as possible. However, the permselective layer must also be free of pinholes or other defects that could destroy the selectivity of the membrane by permitting bulk flow-through of gases. In the context of the invention, the preferred rubbers are polystyrene-butadiene copolymers. Polystyrene-butadiene copolymers are available commercially as Kraton ® from Shell Chemical, Houston, Tex. Using these polymers, it is possible to coat defect-free films 1 micron or less thick onto a finely microporous support. Because solutions of the rubbery polymers used in the invention can wet a finely microporous support and leave a uniform, defect-free coating after solvent evaporation, the preferred membrane is one in which the permselective coating is deposited directly on the microporous support. However optional embodiments that include additional sealing or protective layers above or below the permselective layer are also intended to be encompassed by the invention.

The preferred method of depositing the permselective layer is by dip coating. In order to use this method, the polymer material that forms the permselective layer should be a film-forming material that is soluble in standard organic solvents. The dip coating method is described, for example, in U.S. Pat. No. 4,243,701 to Riley et al., incorporated herein by reference, and in an article of W. J. Ward III et al., "Ultrathin Silicone Polycarbonate Membranes for Gas Separation Process", J. Memb. Sci., 1, page 99 (1976). For example, a support membrane from a feed roll is passed through a coating station, then to a drying oven, and is then wound onto a product roll. The coating station may be a tank containing a dilute polymer or prepolymer solution, in which a coating typically 50 to 100 microns thick is deposited on the support. Assuming a 1% concentration of polymer in the solution, after evaporation a film 0.5 to 1 micron thick is left on the support.

Alternatively, the permselective membrane may be cast by spreading a thin film of the polymer solution on the surface of a water bath. After evaporation of the solvent, the permselective layer may be picked up onto the microporous support. This method is more difficult in practice, but may be useful if the desired support is attacked by the solvent used to dissolve the permselective material.

The thickness of the permselective layer should normally be in the range of 0.1 to 20 microns, preferably 5 microns or less, and more preferably 0.1 to 1 micron.

The permselective membranes used in the present invention should have a selectivity for propane over methane of at least 5, and preferably 8 or above.

The form in which the membranes are used in the invention is not critical. They may be used, for example, as flat sheets or discs, coated hollow fibers, or spiral-wound modules, all forms that are known in the art. Spiral-wound modules are a preferred choice. References that teach the preparation of spiral-wound modules are S. S. Kreman, "Technology and Engineering of ROGA Spiral Wound Reverse Osmosis Membrane Modules", in *Reverse Osmosis and Synthetic Membranes,* S. Sourirajan (Ed.), National Research Council of Canada, Ottawa, 1977; and U.S. Pat. No. 4,553,983, column 10, lines 40–60. Alternatively, the membranes may be configured as microporous hollow fibers coated with the permselective polymer material and then potted into a module.

The process of the present invention is now further described with reference to FIG. 1, which is a schematic representation of a typical embodiment of the invention. The pressure of the hydrocarbon containing inlet gas is generally in the range of 50 psi to 5000 psi. The gas flows through a horizontal or vertical 2 or 3 phase separator, A of the standard type used in chemical process industries. The purpose of the separator is to remove liquid water or hydrocarbons that could damage the membrane. The separator may contain a mesh pad, a vane type element or coalescing element to facilitate liquid separation. Gas stream 1 from the separator then flows to a filter coalescer, B where aerosol liquids are coalesced and drawn off as stream 3. Optionally, the system includes a heater, the function of which is to warm the gas to a temperature up to 100° C. above its hydrocarbon and/or moisture dewpoint. Depending on the composition of the raw gas, and its temperature, the heater may or may not be necessary. The type of heater used is unimportant; a direct-fired heater, C, a bath heater, or a heat exchanger, D would be suitable. The gas stream 2 from the filter B flows through a heater as required and is then passed to the membrane unit, E.

The membrane unit comprises the membrane element and the membrane housing. The number of membrane elements required will vary according to the volume of gas to be treated, the composition of the feed gas, the desired compositions of the permeate and retentate streams, the operating pressure of the system, and the available membrane area per element. Systems may contain as few as one membrane element or as many as several hundred or more. The elements may be housed individually in pressure vessels or multiple elements may be mounted together in a sealed housing of appropriate diameter and length. The feed gas stream, 4 enters the membrane unit and flows across or through the membrane element. The membrane is selectively permeable for ethane, propane, butane, and the higher hydrocarbons over methane. Depending on the performance characteristics of the membrane, and the operating parameters of the system, the process can be designed for varying levels of hydrocarbon recovery.

The separation obtained with a membrane system is determined by a number of factors. The first is the membrane selectivity, $\alpha$, defined as the ratio of two permeants. The second is the pressure ratio, $\phi$, defined as the ratio of total permeate pressure to total feed pressure. The third is the fraction of feed gas that permeates the membrane. This is called the stage cut, and is defined as the ratio of permeant flow to feed flow. The fourth is the module configuration. The way in which these factors affect gas separation has been discussed in a number of articles. Pertinent references include K. V. Peinemann et al., "The separation of organic vapors from air", AIChE Symposium Series No. 250, Vol. 82, (1966), incorporated herein by reference; W. J. Ward et al., "Ultrathin Silicone/Polycarbonate Membranes for Gas Separation Processes", J. Memb. Sci., Vol. 1, 99, (1976); S. Weller et al., "Fractionation Permeation through Membranes", Chem. Eng. Prog., Vol. 46, 585-91, (1950); and C. Y. Pan et al., "An Analysis of the Single Stage Gaseous Permeation Process", Ind. Eng. Chem. Fundam., Vol 13, 323-31, (1974).

Having passed through the membrane unit, the retentate stream, 5 is depleted in higher hydrocarbons, and correspondingly enriched in methane. The retentate stream is at essentially the same pressure as the feed, and may be used directly as a fuel gas, pipelined, or utilized in any other appropriate manner.

In general, the pressure on the permeate side of the membrane will be substantially lower than that on the feed side. Depending on the application involved the permeate gas stream, 6 may be recompressed, pipelined, liquified, recycled, flared, etc. Many possible applications in the gas, oil, or petrochemical industries, for example, are envisaged.

In many parts of the world, associated gases from oil wells are simply flared off or reinjected into the reservoir or an adjoining reservoir. The sites are often remote, or on offshore platforms where space is at a premium. It is possible to use the membrane-based process described herein to remove propane and heavier components from associated gases. The gases are fed to the membrane system either directly from the production separator, or after compression if necessary, and the resulting hydrocarbon-rich permeate may be compressed, cooled, and recycled or otherwise processed to produce natural gas liquids (NGL) suitable for adding to the crude oil from the production separators. In this way valuable hydrocarbons which would otherwise be flared or reinjected may be recovered.

A second possible application is in the recovery of propane and higher hydrocarbons from gas streams containing much carbon dioxide and/or nitrogen. In the oil industry, nitrogen or carbon dioxide floods are used to recover incremental oil from partially depleted oil fields. When the oil is produced, large volumes of associated gases containing correspondingly large quantities of the flood gas are generated. These gases are compressed for reinjection, and must be subjected to complex and costly processing steps if the valuable hydrocarbon component is to be recovered. The process of the present invention which could treat these large gas volumes, leaving a lean gas retentate stream for reinjection, offers a simple, economic alternative.

A third application is in Btu control. For example, natural or associated gases are often used on oil or gas fields as fuel for reciprocating engines, turbines or other equipment. The raw gas, however, frequently has a Btu value in excess of the maximum safe limit for the engine. The same situation may apply to natural gas streams that are intended for a pipeline, where Btu values are normally kept within the range of 950-1050 Btu/scf. In either case, the process herein described may be used to remove and recover propane and heavier components and thereby reduce the Btu value of the fuel gas. The process of the invention will also remove water vapor and hydrogen sulfide from the raw gas, thus obviating the need for separate treatment steps to dry and sweeten the gas.

A fourth application is dewpoint control for natural gas, which typically must have a required hydrocarbon dewpoint to eliminate condensation of hydrocarbon liquids in the pipeline or simply to meet sales specifications. The process of the invention can remove the propane and heavier hydrocarbons, thereby reducing the hydrocarbon dewpoint to the required level. The retentate stream may then be fed to the pipeline; the hydrocarbon-enriched permeate is suitable for compression and/or to make NGL for utilization as appropriate.

A fifth application NGL recovery from refinery gases or off gases from the petrochemical industry. Gas streams from these sources contain hydrogen in addition to propane and heavier hydrocarbons. The present invention can be used to remove propane and the heavier hydrocarbon components, leaving a higher purity hydrogen retentate, and a permeate that can be processed to produce an NGL product.

A sixth application is in pretreatment of hydrocarbon-laden gas streams. Other commercial membranes-based systems, such as those employing cellulose-type membranes, that are used in the gas and oil industries, may require the feed gas to be pretreated to remove hydrocarbon constituents that may damage the membrane. Incorporation of the present invention into the system prior to the existing membrane process represents a simple, low-cost method of harmful hydrocarbon removal. The permeate from the membranes of the present invention can be used as NGL.

The abovementioned applications and the examples which follow are given to illustrate the invention and should not be construed as limiting the scope of the invention in any way.

EXAMPLE 1

A spiral-wound membrane module was prepared using a multilayer membrane comprising a polysulfone support layer and a permselective Kraton (polystyrene-butadiene copolymer) layer.

The module had a membrane area of 3,000 cm². The module was tested with pure gases at a feed pressure of 50 psig.

The results are shown in Table 2.

TABLE 2

| Gas fluxes through Kraton spiral-wound module. | |
|---|---|
| Gas | Flux ($cm^3$(STP)/$cm^2 \cdot sec \cdot cmHg$) |
| Nitrogen | $6.2 \times 10^{-6}$ |
| Methane | $1.5 \times 10^{-5}$ |
| Ethane | $7.2 \times 10^{-5}$ |
| Propane | $3.2 \times 10^{-4}$ |
| N—Butane | $1.5 \times 10^{-3}$ |
| Carbon dioxide | $4.9 \times 10^{-5}$ |
| Hydrogen | $2.9 \times 10^{-5}$ |

The module had a selectivity of 4.8 for ethane over methane, and 21.3 for propane over methane.

EXAMPLE 2

A module was prepared as in Example 1 using a different Kraton formulation. The module was tested as in Example 1, and the results are shown in Table 3 below.

TABLE 3

Gas fluxes through Kraton spiral-wound module.

| Gas | Flux $(cm^3(STP)/cm^2 \cdot sec \cdot cmHg)$ |
|---|---|
| Nitrogen | $3.0 \times 10^{-6}$ |
| Oxygen | $9.4 \times 10^{-6}$ |
| Methane | $9.1 \times 10^{-6}$ |
| N—Butane | $2.7 \times 10^{-3}$ |
| Carbon dioxide | $4.8 \times 10^{-5}$ |

The module had a selectivity of 297 for butane over methane.

EXAMPLE 3

To illustrate the importance of membrane selectivity, a computer simulation of the removal of propane from natural gas was performed.

Consider a stream containing 90% methane and 10% propane, with an approximate Btu value of 1250 Btu/scf. It is necessary to reduce the Btu value to 1050 Btu/scf or less, and hence the propane content to around 2%, before the gas can be fed to a pipeline. This could easily be accomplished with the module of example 1, which has a methane flux of $1.5 \times 10^{-5}$ $cm^3(STP)/cm^2.sec.cmHg$ and a propane flux of $3.2 \times 10^{-4}$ $cm^3(STP)/cm^2.sec.cmHg$. Some calculated values for this feed stream and membrane as a function of operating pressure are given in Table 4 below. These figures were calculated with a computer program using the computational models of Weller and Steiner, and Pan and Habgood.

TABLE 4

| Feed Pressure (psia) | Permeate pressure (psia) | Membrane area $m^2$ | Compressor hp * | Permeate propane % |
|---|---|---|---|---|
| 500 | 15 | $2.7 \times 10^3$ | $1.23 \times 10^4$ | 46.1 |
| 350 | 15 | $4.4 \times 10^3$ | $1.04 \times 10^4$ | 43.1 |
| 250 | 15 | $7.3 \times 10^3$ | $8.8 \times 10^3$ | 39.5 |
| 100 | 15 | $3.7 \times 10^4$ | $5.2 \times 10^3$ | 26.1 |

*The compressor horse power assumes an efficiency of 65% typical for this type of equipment.
Feed flow is 10,000 l/sec (STP)
Propane feed concentration 10 vol %
Propane retentate concentration 2 vol %

From the table it is clear that membrane area required to treat a fixed volume of feed gas decreases as the feed pressure increases. The concentration of propane in the permeate gas also increases steadily, although at a pressure above 350 psi the rate of increase is not large. This increase in permeate propane concentration means that the fraction of methane lost with the permeate stream is smaller and the costs of liquifying and recovering the permeate are also much reduced. Of course, higher pressures mean higher compressor energy and capital costs, but in this example the economics clearly favor operation at 500 psi or even higher.

EXAMPLE 4

The effect of lower membrane selectivity is shown if the same methane/propane separation is performed with less selective membranes. The results of the calculation are shown in Table 5.

TABLE 5

| Methane flux $cm^3(STP)/cm^2 \cdot sec \cdot cm\,Hg$ | Propane flux | Membrane area $m^2$ | Compressor hp * | Permeate propane % | Stage cut % |
|---|---|---|---|---|---|
| $1.5 \times 10^{-5}$ | $32 \times 10^{-5}$ | $2.7 \times 10^3$ | $1.23 \times 10^4$ | 46.1 | 18 |
| $1.5 \times 10^{-5}$ | $20 \times 10^{-5}$ | $4.0 \times 10^3$ | $1.23 \times 10^4$ | 36.9 | 23 |
| $1.5 \times 10^{-5}$ | $15 \times 10^{-5}$ | $5.1 \times 10^4$ | $1.23 \times 10^4$ | 31.6 | 27 |
| $1.5 \times 10^{-5}$ | $10 \times 10^{-5}$ | $7.4 \times 10^4$ | $1.23 \times 10^4$ | 24.8 | 35 |

*The compressor horse power assumes an efficiency of 65% typical for this type of equipment.
Feed flow is 10,000 l/sec (STP)
Propane feed concentration 10 vol %
Propane retentate concentration 5 vol %

These results show that membranes with high selectivities are required for good separations. In part this is because the membrane area of the system increases as the propane flux decreases and the membrane becomes less selective. Of greater importance is the decrease in concentration of propane in the permeate gas. The means an increasingly large fraction of the feed is being lost as permeate. In this particular example a membrane with a propane/methane selectivity less than 10 would probably be uneconomical.

EXAMPLE 5

In the examples above, a single stage system was assumed. In practise, multistage or multistep systems would frequently be used. A calculation for a two-stage system with recycle, using the membrane of example 1, is shown below. As before a feed concentration of 10% propane, and a retentate concentration of 2% propane are assumed.

TABLE 6

| Concentrations | | | | | |
|---|---|---|---|---|---|
| | Feed | First stage Permeate | First stage Residue | Second stage Permeate | Second stage Recycle |
| Propane % | 10 | 46.1 | 2.0 | 86.2 | 10 |
| Methane % | 90 | 53.9 | 98 | 13.8 | 90 |
| Flow $10^3$ l/s | 10 | 1.81 | 9.16 | 0.86 | 0.95 |

| Operating parameters | | |
|---|---|---|
| | Stage 1 | Stage 2 |
| Feed pressure (psia) | 500 | 250 |
| Permeate pressure | 15 | 15 |
| Membrane area ($m^2$) | 2960 | 842 |
| Compressor (HP)* | $1.23 \times 10^4$ | $1.60 \times 10^3$ |

*Compressor energy assumes compressor efficiency of 65%.

Table 6 shows that the second stage is approximately 30% of the membrane area of the first stage, and consumes an additional 1600 hp of compressor energy. These costs are more than discounted by the increase in the concentration of the final propane stream which increases from 46.1% for a one-stage process to 86.2% for a two-stage system. This reduces the methane loss with the propane stream substantially and produces an increase in the fraction of the feed that can be sent to the pipeline from $8.2 \times 10^3$ l/sec to $9.2 \times 10^3$ l/sec.

I claim:

1. A gas separation process, comprising the steps of:

passing a first gas mixture comprising methane as its major constituent, and further comprising at least one gas from the group consisting of ethane and heavier hydrocarbons, across the feed side of a membrane having a feed side and a permeate side, said membrane comprising a microporous support layer and an ultrathin permselective layer, and wherein said membrane has a selectivity for propane over methane of 8 or more;

withdrawing from said permeate side a second gas mixture enriched in at least one gas from the group consisting of ethane and heavier hydrocarbons compared with said first gas mixture, wherein the ratio of the volume flows of said second gas mixture and said first gas mixture is less than about 27%, and the ratio of the concentration of said one gas in said second gas mixture and said first gas mixture is at least about 3; and withdrawing from said feed side a third gas mixture enriched in methane compared with said first gas mixture.

2. The process of claim 1, wherein the membrane has a selectivity for propane over methane of 12 or more.

3. The process of claim 1, wherein said ultrathin permselective layer comprises polystyrene-butadiene copolymer.

4. The process of claim 1, wherein said first gas mixture comprises natural gas.

5. The process of claim 1, wherein said first gas mixture comprises associated gases from oil wells.

6. A gas separation process, comprising the steps of:

passing a first gas mixture comprising methane as its major constituent, and further comprising at least one gas from the group consisting of ethane and heavier hydrocarbons, across the feed side of a membrane having a feed side and a permeate side, said membrane comprising a microporous support layer and an ultrathin permselective layer, and wherein said membrane has a selectivity for propane over methane of 8 or more;

withdrawing from said permeate side a second gas mixture enriched in at least one gas from the group consisting of ethane and heavier hydrocarbons compared with said first gas mixture, wherein the ratio of the volume flows of said second gas mixture and said first gas mixture is less than about 27%, and withdrawing from said feed side a third gas mixture enriched in methane compared with said first gas mixture; wherein the proportion of methane retained on said feed side in said third gas mixture is at least about 80%.

7. A process for controlling the Btu value of a gas stream, comprising the steps of:

passing a first gas mixture comprising methane as its major constituent, and further comprising at least one gas from the group consisting of ethane and heavier hydrocarbons, and having a Btu value greater than 1050 Btu/cubic foot, across the feed side of a membrane having a feed side and a permeate side, said membrane comprising a microporous support layer and an ultrathin permselective layer, and wherein said membrane has a selectivity for propane over methane of 8 or more;

withdrawing from said permeate side a second gas mixture enriched in at least one gas from the group consisting of ethane and heavier hydrocarbons compared with said first gas mixture, wherein the ratio of the volume flows of said second gas mixture and said first gas mixture is less than about 27%; and withdrawing from said feed side a third gas mixture enriched in methane compared with said first gas mixture, and having a Btu value less than 1050 Btu/cubic foot.

8. A hydrocarbon recovery process, comprising the steps of:

passing a first gas mixture comprising methane as its major constituent, and further comprising at least one gas from the group consisting of ethane and heavier hydrocarbons, across the feed side of a membrane having a feed side and a permeate side, wherein said membrane has a selectivity for propane over methane of 8 or more;

withdrawing from said permeate side a second gas mixture enriched in at least one gas from the group consisting of ethane and heavier hydrocarbons compared with said first gas mixture, wherein the ratio of the volume flows of said second gas mixture and said first gas mixture is less than about 27%; and withdrawing from said feed side a third gas mixture enriched in methane compared with said first gas mixture, wherein the proportion of said one gas retained on said feed side in said third gas mixture is less than 30%.

* * * * *